US007159173B2

(12) United States Patent
Trenz (10) Patent No.: US 7,159,173 B2
(45) Date of Patent: Jan. 2, 2007

(54) METHOD, COMPUTER SYSTEM AND COMPUTER PROGRAM PRODUCT FOR PRINTING A DOCUMENT PAGE

(75) Inventor: Thomas Trenz, Gultlingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 09/801,478

(22) Filed: Mar. 7, 2001

(65) Prior Publication Data

US 2002/0054300 A1    May 9, 2002

(30) Foreign Application Priority Data

Aug. 30, 2000   (EP)   ................... 00307436

(51) Int. Cl.
*G06F 15/00* (2006.01)
*G06F 17/00* (2006.01)
(52) U.S. Cl. .................. 715/527; 715/530; 713/100; 358/1.13; 358/1.9
(58) Field of Classification Search ............. 715/527, 715/530; 713/100; 358/1.9, 1.13
See application file for complete search history.

(56) References Cited

U.S. PATENT DOCUMENTS

| | | | | |
|---|---|---|---|---|
| 5,652,901 | A * | 7/1997 | Slayden et al. | 715/527 |
| 5,717,838 | A * | 2/1998 | LeClair | 358/1.9 |
| 6,615,346 | B1 * | 9/2003 | Kawamoto | 713/100 |
| 6,694,487 | B1 * | 2/2004 | Ilsar | 715/527 |
| 6,708,309 | B1 * | 3/2004 | Blumberg | 715/530 |
| 6,757,071 | B1 * | 6/2004 | Goodman et al. | 358/1.13 |

FOREIGN PATENT DOCUMENTS

| | | |
|---|---|---|
| EP | 0933692 A2 | 8/1999 |
| WO | WO 97/42594 | 11/1997 |

OTHER PUBLICATIONS

Office 2000 "Web-Ready", DiGiacomo, George, InternetNews article, <http://internetnews.com/dev-news/article.php/132471>, pp. 1-3, downloaded on Oct. 31, 3004.*
Microsoft Word 2000, 1999 Microsoft Corporation, application screenshots pp. 1-12.*
Microsoft Word 2000, Microsoft Corporation, additional application screenshots pp. 13-21, said application released Jun. 7, 1999.*
Microsoft Word 2000, 1999 Microsoft Corporation, additional screenshots pp. 22-26.*
Berry Press et al., "P.C. Upgrade and Repair Bible", 2000, third edition, pp. 746-749.
Jeff Prosise, "Programming Window s w ith MFC", 1999, second edition, pp. 759-801.

* cited by examiner

*Primary Examiner*—William Bashore (57) ABSTRACT

The invention is directed to a method performed by a computer system to print a document page on one sheet or split over several sheets, comprising: simultaneously displaying on a computer display a preview of the document page as it will be printed, including displaying sheet splitting, and at least one control element for modifying the print scale or the number of sheets; dynamically changing the displayed sheet splitting in response to a corresponding actuation of the control element; printing the document page according to the displayed sheet splitting upon receiving a print command. The invention is also directed to a corresponding computer system an a corresponding computer program product.

16 Claims, 6 Drawing Sheets

METHOD, COMPUTER SYSTEM AND COMPUTER PROGRAM PRODUCT FOR PRINTING A DOCUMENT PAGE

FIELD OF THE INVENTION

The present invention relates generally to computing systems provided with printing functionalities, and more particularly to a method, a computer system and a computer program product for printing a document page on one sheet or split over several sheets.

BACKGROUND OF THE INVENTION

Although documents generated by computer programs are more and more stored and transmitted in the form of computer-readable digital data, computer systems will still have, even in the long term, the ability to produce printouts of such documents on paper sheets.

Early personal computer printers could, for the most part, only print characters. Functions like the positioning and definition of margins and fonts were indicated by special codes sent by the personal computer. The codes for printers from different manufacturers were incompatible with each other, and each application program had a different set of printer drivers with those codes embedded. A printer driver is a special purpose program that typically processes printer-independent printing information to printer-dependent printing information usable by the corresponding printer to produce printouts. As software became more capable—word processors, presentation graphics, and page layout programs in particular—this technique became impractical. Different application programs had a different set of drivers. If a user bought a new printer, he had to get new drivers from each of his software vendors. The software vendors had to create and maintain their printer driver libraries.

Modern operating systems, like Windows (Windows is a trademark of Microsoft Corporation) simplified this problem, because they provided a printer-independent interface between application programs and the printers. In the Windows operating system, the application program draws on a page through the same interface provided by the operating system it uses to draw on a computer screen, the graphics device interface (GDI). The GDI then sends commands to the printer driver, which translates into the language the printer understands and, with the help of a communications port driver, sends the result to the printer.

In order to reduce the processing load on the computer and the transfer load when printing over a network, for the most part, printer drivers use what is called a page description language to communicate what is required to the printer. Two page description languages are widely used: PostScript (developed by Adobe) and PCL (developed by Hewlett-Packard) (PostScript and Adobe are trademarks of Adobe Systems Incorporated, and PCL and Hewlett-Packard are trademarks of Hewlett-Packard Corporation). Notwithstanding the fact that many printer manufacturers have standardised on PCL or PostScript, printer drivers specific to the respective printer are still needed. This is mainly because the printer drivers allow the control options and features in the printers, and the controls for them are not standardised. Most Windows printer drivers are based on a core printer driver, developed by Microsoft (Microsoft is a trademark of Microsoft Corporation), that handles things like rendering fonts, choosing the port the printer is connected to, and otherwise performing the tasks needed to send a page to the printer. The printer manufacturer builds tables that tell the core driver how to accomplish the necessary functions, and adds functions, for example related to colour matching, paper handling, and maintenance (Barry Press et al.: PC Upgrade and Repair Bible, 2000, third edition, pages 746–749).

Since modern application programs provide the user with many ways to print a document, the need has arisen to be able to visually check the desired printout of the document before the user proceeds to make the actual printout. Therefore, many application programs can provide the user with a print preview on the screen of the computer system. A print preview functionality can now even be implemented on the level of the Windows operating system by using the object-oriented Microsoft Foundation Class library, better known by the acronym MFC (Jeff Prosise: Programming Windows with MFC, second edition, 1999, pages 759–801). The Windows operating system and MFC allow a preview of the document to be printed even if the application program that has generated the document has no preview functionality. In order to make sure that the preview of the document to be printed looks exactly like the subsequent actual printout, it is known from EP 0 933 692 A2 assigned to Hewlett-Packard Company that the printer driver (rather than the application program) provides the print preview.

In the known print previews, the user can actuate buttons for going to the next or the previous page, switching between one-page and two-page views, zooming in and out, and so on. However, he can not modify what will be printed. If he is satisfied with what is presented, the user may click a print button to have the corresponding print job processed further and sent to the printer to produce an actual print-out. However, if the user wants to modify what will be printed, he has to actuate a cancel button to discontinue the printing process at this point and return to a previous step in the printing process or to the application program where the necessary modifications can be carried out.

For many applications of computer systems, there is a need to generate pages which are too large to fit on one sheet of paper, in particular, on a sheet of paper in a format usually used for correspondence, for example DIN A4 (210×297 mm) or US-Letter (8.5×11 inch), called "note paper" hereinafter. Such a page can be, for example, a construction drawing generated by a CAD application program. If such a drawing were scaled down to fit on one note paper sheet the necessary details of the drawing would not be visible any more.

A possible solution is the use of special printers for large paper sheets, for example, plotters for DIN A1 sheets (59.4×84 cm). Another solution, in situations where such a special printer is not available, is to split the page into several smaller parts and to print them on note paper sheets subsequently. The separately printed sheets can then be put together like tiles so as to form a large-scale printout of the page. Normally, such a tile-like printing functionality is implemented on the level of an application program, but it is also known from EP 0 933 692 A2 to implement it on the level of a printer driver.

A typical application where large pages are generated and have to be printed is architectural software, for instance the program ArchiCAD 6.0 (ArchiCAD is a trademark of Graphisoft Corporation). The ArchiCAD 6.0 program allows the user to choose a paper format and print scale. Depending on the user's choice, the program can split a page into several printout sheets. It displays a schematic representation of the number of required sheets as well as the effective print region on these sheets.

EP 0 933 692 A2, which has already been mentioned above, discloses a special printer feature called "BillBoard 2×2". The choice of this feature by a user causes the printer driver to process a print job for a page to be printed on one sheet into a print job for a four-sheet printout. This printout can be viewed in a preview window exactly as it will be printed. If the user decides to change a printing feature after inspecting the preview window, for example, to change from a four-sheet printout to a one-sheet printout or vice versa, he has to actuate a cancel print button and to return to a previous window where he can make the corresponding settings.

SUMMARY OF THE INVENTION

A method performed by a computer system prints a document page on one sheet or split over several sheets. The method comprises the steps of: simultaneously displaying on a computer display a preview of the document page as it will be printed, including displaying sheet splitting, and at least one control element for modifying the print scale or the number of sheets; dynamically changing the displayed sheet splitting in response to a corresponding actuation of the control element; printing the document page according to the displayed sheet splitting upon receiving a print command.

According to another aspect, a computer system comprises a processing unit and storage for processing programs and program components, a computer display, a printer and an application program for creating at least one document page. The program component causes a print preview of the document page, including sheet splitting, and at least one control element for modifying a print scale or the number of sheets to be simultaneously displayed on the computer display, further causes the displayed sheet splitting to dynamically change in response to a corresponding actuation of the control element, and causes the document page to be printed according to the displayed sheet splitting upon receiving a print command.

According to still another aspect, a computer program product includes program code for carrying out the following method for printing a document page on one sheet or split over several sheets, when executed on a computer system. The method comprises: simultaneously displaying on a computer display a preview of the document page as it will be printed, including displaying sheet splitting, and at least one control element for modifying the print scale or the number of sheets; dynamically changing the displayed sheet splitting in response to a corresponding actuation of the control element; causing the document page to be printed according to the displayed sheet splitting upon receiving a print command.

Other features are inherent in the disclosed method, computer system and computer program product or will become apparent to those skilled in the art from the following detailed description of embodiments and its accompanying drawings.

DETAILED DESCRIPTION OF THE PREFERRED EMBODIMENTS

Functional aspects of preferred embodiments will be described with reference to FIG. 1 to 5, and structural aspects with reference to FIG. 6 to 10. Before proceeding further with the description, however, a few terms will be defined.

The term "sheet" mainly refers to a paper sheet on which a printer prints a printout. Preferably, the paper sheets have note-paper format. However, it is likewise possible to print in a file rather than on paper. In this case, a "sheet" is that part of the print file which corresponds to what is printed on a paper sheet when the print file is actually printed on paper. Thus, the term "sheet" refers to a physical object—a paper sheet—or to that part of a print file which directly corresponds to such a physical object.

In contrast, the term "page" refers to a virtual object. It is that part of a document represented by digital data which represents information that shall be viewable together in one view, for example a construction drawing, a network map, a class diagram, a business drawing or a business diagram. (In the particular case where the document consists of only one page, the term "page" refers to the whole document). If a page is smaller than or equal to the sheet size, it can be printed on one sheet. However, if it is larger than the sheet size, only parts of it can be printed on the sheets.

In some preferred embodiments the print preview method is implemented by an application program, normally an application program which generates or handles documents to be printed. In these implementations the print preview method is limited to the respective application program and usually cannot be shared between different application programs. However, if the print preview method is implemented by a printer driver or an operating system, as in other preferred embodiments, the "tile-like" printing functionality can be provided even if application programs are used which do not allow a page to be split into several sheets. Further, the "look and feel" of the tile-like printing functionality is then the same for all applications.

Figure 1:
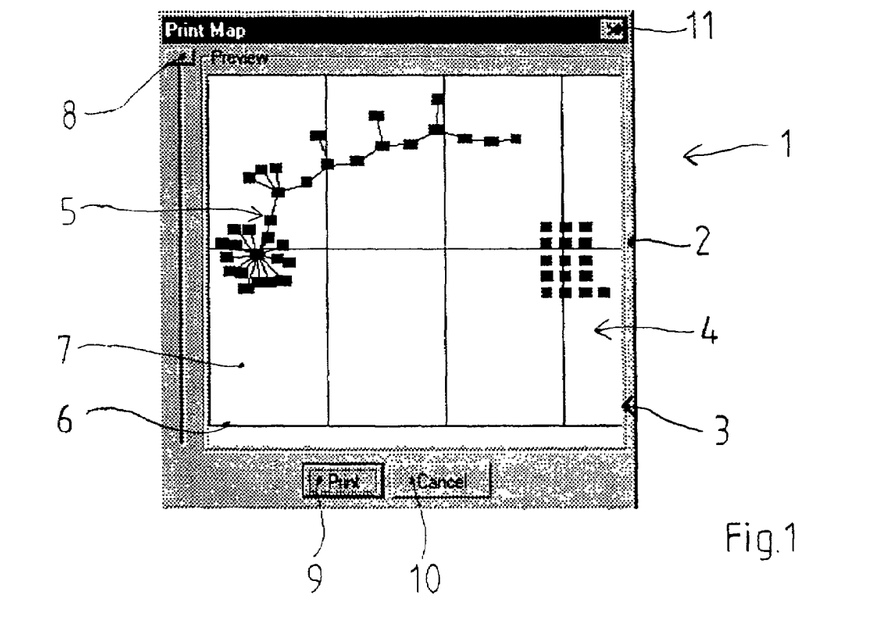
FIG. 1 shows a print preview of a document page to be printed on eight sheets in a vertical format.

Normally, a job to printout a document page generated by an application program is initiated by that application program. It draws on a page through an interface provided by the operating system which, in turn, sends commands to a printer driver, which translates these into the language the printer understands and sends the results to the printer via a communication port driver. Usually, when an application program generates a document to be printed, the graphical representation, i.e. the arrangement and presentation of the page information depends on the sheet size. (In certain application programs, like word processors, even the decision as to what belongs to a certain page depends on the sheet size). Therefore, normally the sheet size has to be defined before an application program can prepare a page for the printout and pass the print job to the operating system. If the disclosed print preview method is implemented by the printer driver or the operating system, the page size definition used by the application program generally differs from the total size of the "tile-like" sheets on which the page is printed, since the user can modify the print scale and/or the number of sheets after the application program has passed the print job to the operating system. Preferably, a program that initiates a print job uses a virtual sheet size which is larger than the actual sheet size. Most preferably, the virtual sheet size is at least equal to the total size of the largest possible number of sheets to be used for printing a document in the disclosed tile-like printing method. For example, if the maximum number of sheets is eight and these sheets are arranged as shown in FIG. 1 (two rows of four sheets), the virtual sheet size for DIN A4 sheets would be at least 840×594 mm. When the print job is passed to the printer driver or the operating system, the disclosed print preview method is carried out using a representation of the page adapted to that virtual sheet size as an input. If the virtual sheet size chosen is sufficiently large, the disclosed print preview method will then only scale down the representation of the page drawn on the virtual sheet by the application program. However, it is likewise possible that the application program uses a smaller virtual sheet size, and the printer driver or the operating system scales up the representation of the page drawn on the virtual sheet by the application program.

In the embodiments shown the control element with which a user can change the print scale and/or the number of sheets is a graphical slider. Graphical sliders are normally employed to allow a user to scroll a document in a window of a graphical user surface. Although a graphical control element, like the graphical slider is preferred, the control element could alternatively be a non-graphical control element, for example a field where the user can type in the print scale or the number of sheets or a menu from which the user can select these.

In the disclosed embodiments, the sheet splitting is displayed by overlaying the preview of the document page with a grid. Each field of the grid corresponds to one sheet. This solution provides the user with an impression of how the tile-like printout will like when the individual sheets are assembled together. Alternatively, the individual sheets can be displayed in the preview with spaces between them.

After having printed the individual sheets, the user often wants to assemble the "tiles" to get a printed representation of the entire page. This assemblage may be facilitated by a sheet location identification which is printed on the individual sheets. For example, it is a small graphic which is printed in a corner (e.g. upper left corner) of each page. It identifies the location of the individual sheet in relation to the entire page. For this purpose, in the disclosed embodiments the graphic sketches the sheet splitting of the preview, with the field corresponding to the respective sheet being marked, for example by colour code or grey scale.

It may happen that a user wants to use certain sheets of a tile-like printout individually, without the surrounding sheets. Or, it may be desirable not to split a certain detail of a page to be printed into two or more parts since this may degrade the quality of the detail when the "tiles" are assembled. Therefore, in some of the disclosed embodiments, the user can shift the sheet splitting relative to the page by a corresponding actuation of a sheet splitting shift control element (like one or two graphical sliders) or a pointing device (like a "mouse" or a trackball in conjunction with a mouse or trackball pointer).

Although the disclosed method is preferably implemented by software, it could likewise be implemented in whole or in part by firmware or hardware without departing from the scope or spirit of the invention.

FIG. 1 to 5 show the functional aspects of the disclosed embodiments.

FIG. 1 shows a dialog box 1 as it appears on a screen of a computer system described below in more detail. It appears when the user has initiated a print job by giving an application program a corresponding print command. The dialog box 1 is composed of a dialog-box frame 2 surrounding a print preview window 3 in which a print preview 4 is displayed. The print preview 4 shows a graphical representation 5 of a page to be printed. In the example of FIG. 1 to 4, it is a representation of what is called a topology map. Such a map shows segments, notes and devices of a network as well as other attached networks. The graphical representation 5 is overlaid with a grid 6 which divides it into several fields 7. Each field 7 represents one sheet of paper printout. Those parts of the graphical representation 5 which lie together within one field 7 will be printed on one sheet. Thus, the grid 6 visualises how the page will be split into several sheets when it is printed. At the left side of the dialog-box frame 2 a graphical slider 8 is provided. The user can move it and, thereby, modify the print scale in a quasi-continuous manner. In the example shown in FIG. 1, the slider 8 is shown in its uppermost position which corresponds to a 100% print scale. In the shown 100% print scale, the outer contour of the grid 6 corresponds to the edge of the virtual page on which the application program has drawn the graphical representation 5. The dialog-box frame 2 includes further control elements: a print button 9, a cancel button 10 and a close button 11. Upon clicking on the print button, the print job proceeds further and causes a tile-like printout of what has been displayed in the print preview window 3. By clicking on the cancel button 10, the dialog box 1 is closed, and the user is brought back to a previous stage of a print menu or to the application in which the initial print command was given. The function of the close button 11 corresponds to that of the cancel button 10. In the example of FIG. 1, the print preview window 3 is relatively small and, therefore, shows only a part of the document page and the overlaid grid 6. The print preview window 3 can easily be expanded so as to show the entire page, for example by positioning the mouse cursor over the corresponding dialog box frame, depressing the mouse button and dragging the frame edge in a corresponding direction.

Figure 2:
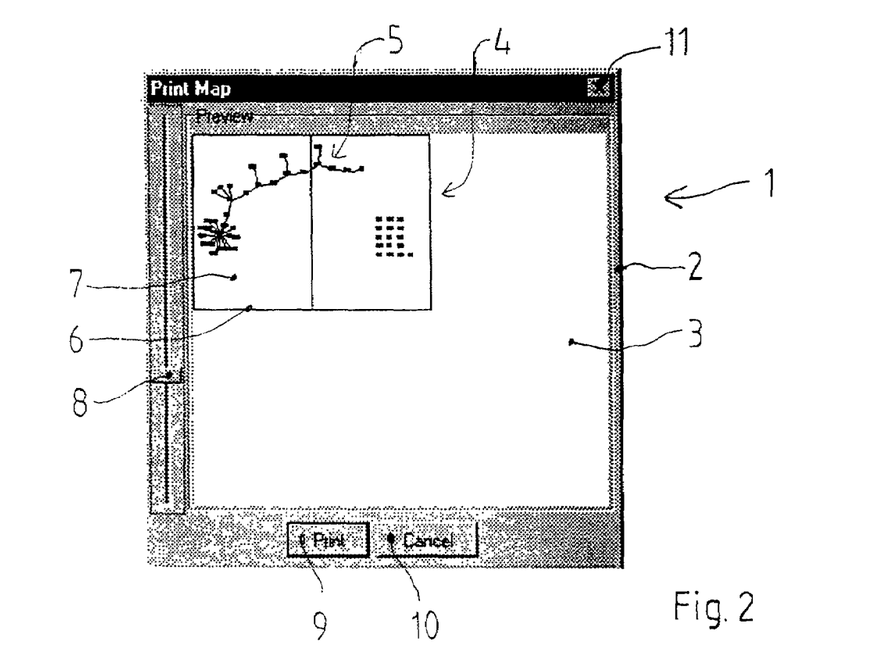
FIG. 2 shows a print preview as in FIG. 1, with the document page to be printed on two sheets.

FIG. 2 shows a print preview of the same document page as shown in FIG. 1, however, scaled down to about 33% of the print scale of FIG. 1. The grid 6 has now only two fields 7 corresponding to two sheets, and the graphical representation 5 of the page (the topology map) fits on these two sheets. The slider 8 is now in a lower position, about ⅓ of the distance between the lowermost and uppermost positions above the lowermost position. In other embodiments (not shown) the correspondence between slider position and scale factor is not proportional; then, the slider position might be in the middle between the upper most and lower most positions at 30% print scale. The transition from the print scale of FIG. 1 to the one of FIG. 2 is performed by a user who pulls down the slider 8 by means of a pointing device. In response to the continuous downward movement of the slider 8, the graphical representation 5 continuously becomes smaller, whereas the size of the fields 7 remains constant. As soon as the actual size of the graphical representation 5 requires a smaller number of sheets, the number of sheets jumps automatically to the smaller value then required, i.e. the corresponding fields of the grid 6 disappear. For example in the transition from FIG. 1 to FIG. 2 at first the number of fields 7 per row decreases from four to three, resulting in a decrease in the number of fields 7 from eight to six. Then, the number of rows decreases from two to one, resulting in a decrease in the number of fields 7 from six to three. Finally, the number of fields 7 in the remaining row decreases from three to two. The continuous decrease in the print scale and the discontinuous decrease in the number of fields 7 happens dynamically in correspondence to the actuation of the slider 8 which is part of the preview dialog box 1, while the user can inspect the preview. Thus, the user does not need to go to any other dialog box, let alone to cancel or close the print preview dialog box 1.

Figure 3:
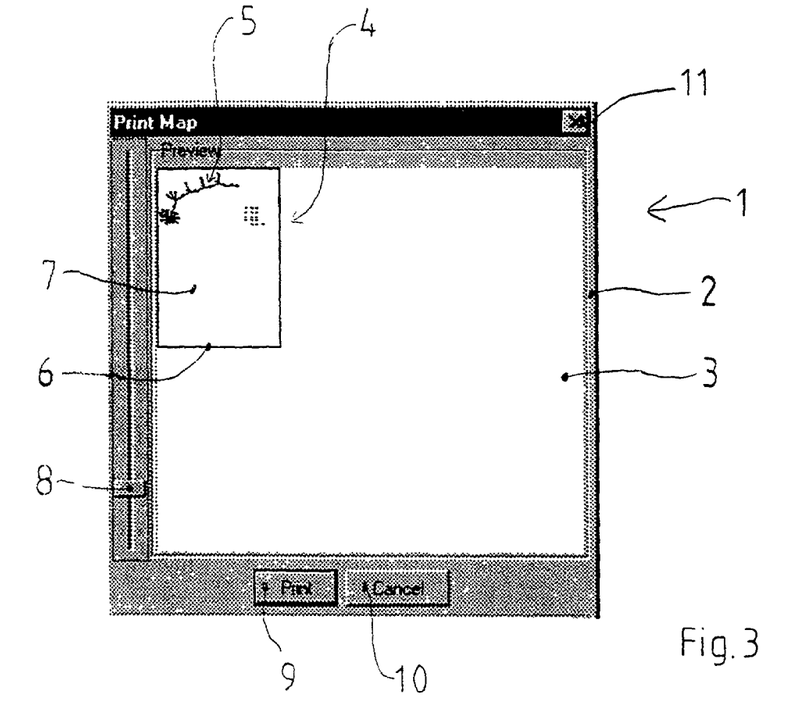
FIG. 3 shows a print preview as in FIG. 1, with the document page to be printed on one sheet.

If the slider 8 is pulled down further to a position corresponding to, say, 17% print scale, the size of the graphical representation 5 is continuously reduced to that scale, and the number of fields 7 decreases from two to one without changing the field size. The result is shown in FIG. 3. The graphical representation 5 of the page now only takes up a part of the field 7 (here: the upper half of it). A further reduction of the print scale is possible, which reduces the part of the field 7 occupied by the graphical representation 5. In the non-occupied part of field 7 the printed sheet remains blank.

Figure 4:
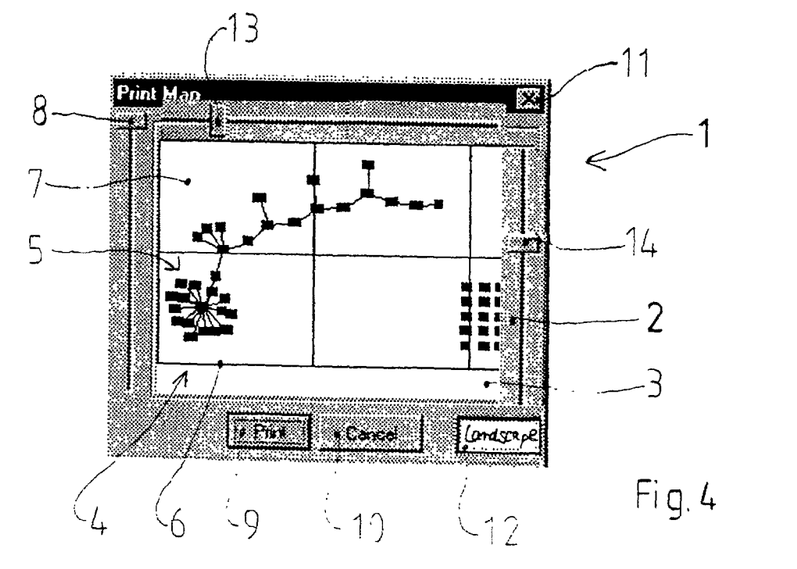
FIG. 4 shows a print preview as in FIG. 1, with the document page to be printed on six sheets in a landscape format.

FIG. 4 shows a dialog box 1 which corresponds to the dialog box of FIG. 1 to 3 and which offers the user additional functions. One of these additional functions is the possibility to switch between vertical sheet format (as in FIG. 1 to 3) and horizontal sheet format (also known as "landscape" format), as shown in FIG. 4. The user can switch between these two formats by clicking on a landscape button 12 located at the lower side of the dialog box frame 2. Depending on the actual size and format of the document, it may happen that the number of fields 7 changes when the user switches from one format to the other. For example, in FIG. 4 the graphical representation 5 (topology map), which is displayed in a 100% print scale, is shown to require only six sheets in the landscape format, whereas it requires eight sheets in the vertical format of FIG. 1.

The second additional function allows the user to shift the grid 6 relative to the graphical representation 5. By actuating a horizontal grid displacement slider 13 the user can achieve a relative displacement in the horizontal direction, and by actuating a vertical grid displacement slider 14 he can achieve a relative displacement in the vertical one. The displacements are displayed dynamically, as the print scale variations, without a need to go to another dialog box or to close the print preview dialog box 1. The grid displacement sliders 13, 14 are provided at the upper and right side of the dialog-box frame 2, respectively.

Figure 5:
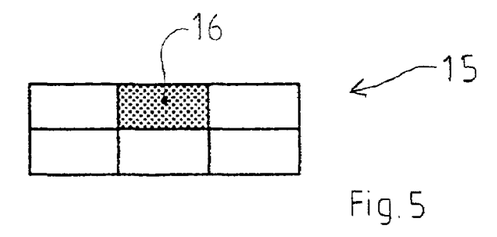
FIG. 5 schematically depicts a page location identification.

FIG. 5 shows a sheet location identification graphic 15 which is printed on the upper left corner of the sheet corresponding to the middle upper field 7 of the print preview 4 of FIG. 4. It depicts the arrangement of the several "titles" of the page, here six sheets (two rows of three sheets) in the horizontal format. The location of the actual sheet in relation to the entire page is identified by a mark 16 in the corresponding field of the sheet location identification graphic 15, for example a grey or coloured mark 16. When all "tiles" of a page have been printed, the user can easily assemble them by means of the sheet location identification graphic 15 to form a large-scale printout of the page.

FIG. 6 to 10 show structural aspects of the disclosed embodiments.

Figure 6:
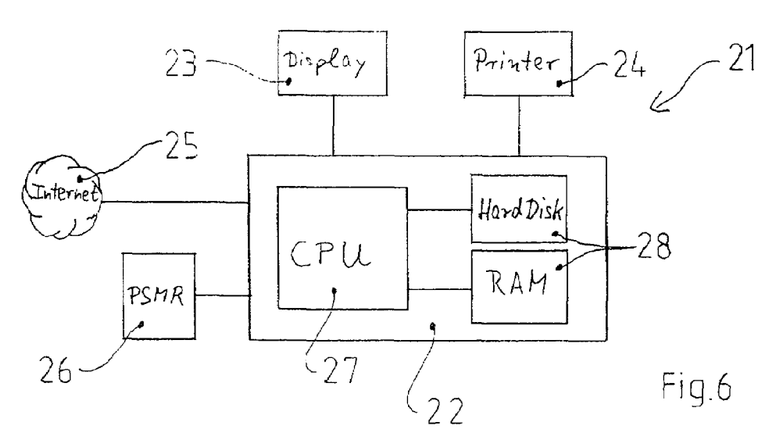
FIG. 6 schematically depicts a computer system on which a print preview method is executed.

A typical computer system 21 for providing the print preview functionality of FIG. 1 to 5 is shown in FIG. 6. It comprises a Personal Computer 22, a display 23 and a printer 24. The Personal Computer 22 is connected to a network 25, preferably the Internet, and/or has a portable storage medium reader (PSMR) 26, for example a floppy disk drive or a CD-ROM drive. It is equipped with a central processing unit 27 (CPU) and storage 28, for example a random access memory (RAM) and a hard disk. A program including program code for carrying out the disclosed method is stored in the storage 28 and is executed by the CPU 27. It can be loaded into the storage 28 from a host in the network 25 or from a portable storage medium by means of the PSMR 26.

Figure 7:
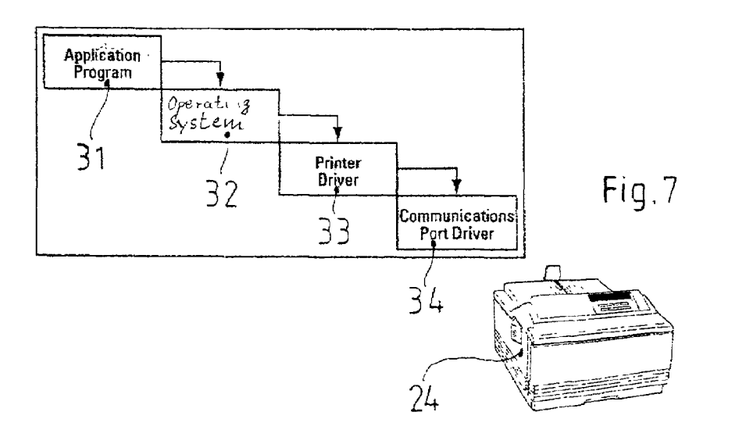
FIG. 7 is a schematic representation of how a print job is processed under the Windows operating system.

FIG. 7 is high-level diagram of how a print job is processed under the Windows operating system. The processing is similar under other operating systems, like Linux. An application program 31 generates a page and starts a print job to print a graphical representation of the page. It draws the page through a graphics device interface (GDI) provided by the Windows operating system 32. The operating system 32 then passes the print job to the printer driver 33 which processes the printer-independent printer information from the operating system 32 to printer-dependent printing information and sends the information via a communications port driver 34 to the printer 24. The operating system 32 uses a page description language, like PostScript or PCL. The disclosed print preview method can be implemented by the application program 31, the operating system 32 or the printer driver 33. Since the implementations in these last two cases are similar, only the first and third possibilities are described in further detail below.

Figure 8:
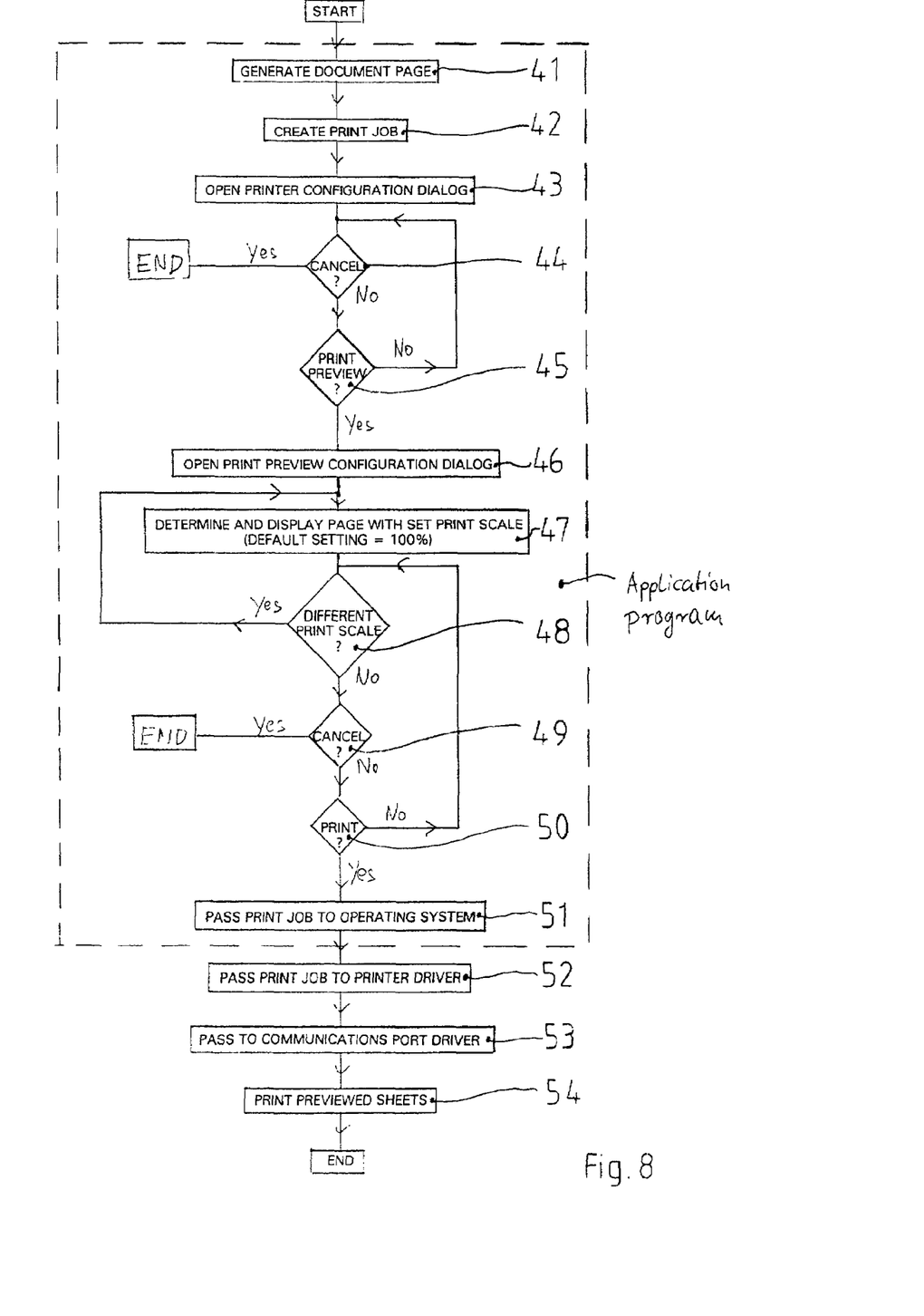
FIG. 8 is a flow diagram of a method to print a document page wherein a print preview functionality is implemented by an application program.

FIG. 8 is a flow diagram which illustrates an implementation by the application program 31. In step 41, a document page is generated, for instance the topology map shown in FIG. 1 to 5. If the user wants to print the page and gives a corresponding print command, a print job is created in step 42, and a printer configuration dialog is opened on the display 23 in step 43. The user has the possibility to cancel the print job in step 44 or to choose a print preview in step 45. If he chooses the print preview, a print preview dialog is opened in step 46. In step 47 the graphical representation 5 of the page and the sheet splitting 6 are determined and displayed in the dialog box 1, on the basis of the set print scale. A default setting of the print scale is 100%. In step 47, also a control element for modifying the print scale (the slider 8) is displayed in a position which corresponds to the set print scale. In step 48, the user can set a different print scale by actuating the control element. If he does that, the method returns to step 46 and carries out this step with the different print scale chosen by the user (and also the subsequent steps, if no further different print scale is chosen). In other words, the new slider position is displayed and a correspondingly modified graphical representation 5 of the page and the sheet splitting 6 is determined and displayed in the print preview window 3. The user can cancel the print preview dialog in step 49 or give a print command in step 50 by clicking on the print button 9. If he gives the print command, the print job is passed in step 51 to the operating system 32 by drawing the page into the GDI of the operating system 32. The steps described so far (steps 41 to 51) are performed by the application program 31. Then, in step 52, the operating system 32 passes the print job to the printer driver 33, which, in turn, passes it in step 53 to the communications port driver 34 which passes it in step 54 to the printer 24. The printer 24 prints the graphical representation 5 in a tile-like manner, as it was presented to the user in the print preview step 47.

Figure 9:
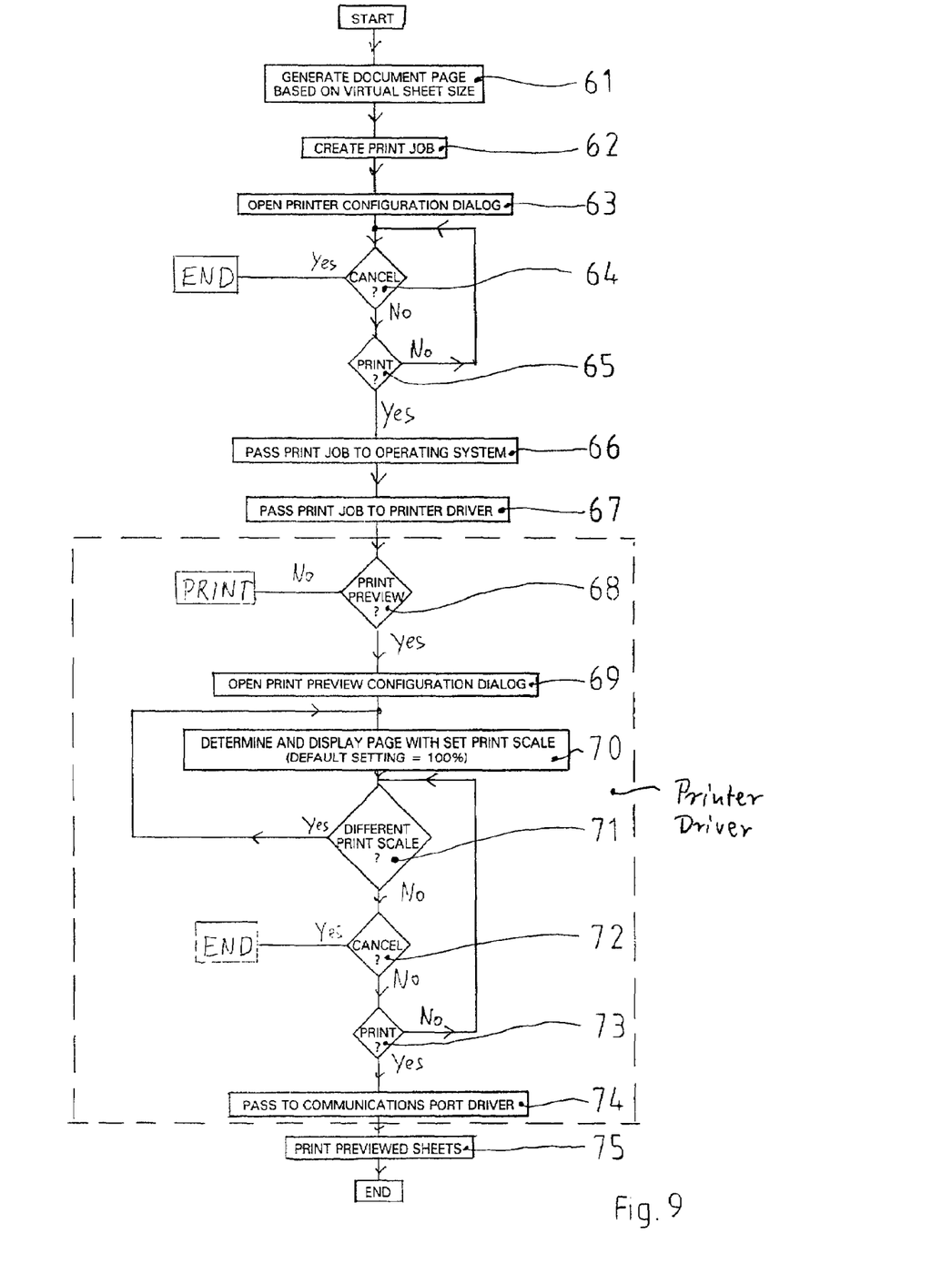
FIG. 9 is a flow diagram of a method to print a document page wherein a print preview functionality is implemented by a printer driver.

FIG. 9 is a similar flow diagram which illustrates an implementation by the printer driver 33. Steps 61 to 64 correspond to steps 41 to 44 of FIG. 8. It should be noted, however, that the application program 31 generates the document page in step 61 based on a virtual sheet size, which is at least equal to the total size of the largest possible number of sheets to be used for the tile-like printing method. In the framework of the application program 31, the user cannot yet choose a print preview after step 64, as in step 45 of FIG. 8. Rather, he can choose to progress with the print process in step 65. Then, in step 66, the print job is passed to the operating system 32, corresponding to step 51 of FIG. 8. In step 67, the operating system 32 passes the print job to the printer driver 33.

In the embodiment of FIG. 9, the printer driver 33 is responsible for the print preview functionality and carries out the "preview steps" 68 to 73 on the page which has been generated by the application program 31 assuming the virtual sheet size. These steps correspond to steps 45 to 50 of FIG. 8 which have already been described in detail. After the preview steps, the printer driver 33 passes the print job in step 74 to the communications port driver 33 (corresponding to step 53), which, in turn, passes it in step 75 to the printer 24 (corresponding to step 54). In summary, steps 61 to 66 are performed by the application program 31, step 67 is performed by the operating system 32, steps 68 to 74 are performed by the printer driver 33, step 75 is performed by the communications port driver 34. The printer 24 prints the graphical representation 5 in a tile-like manner, as it was presented to the user in the print preview step 70.

Figure 10:
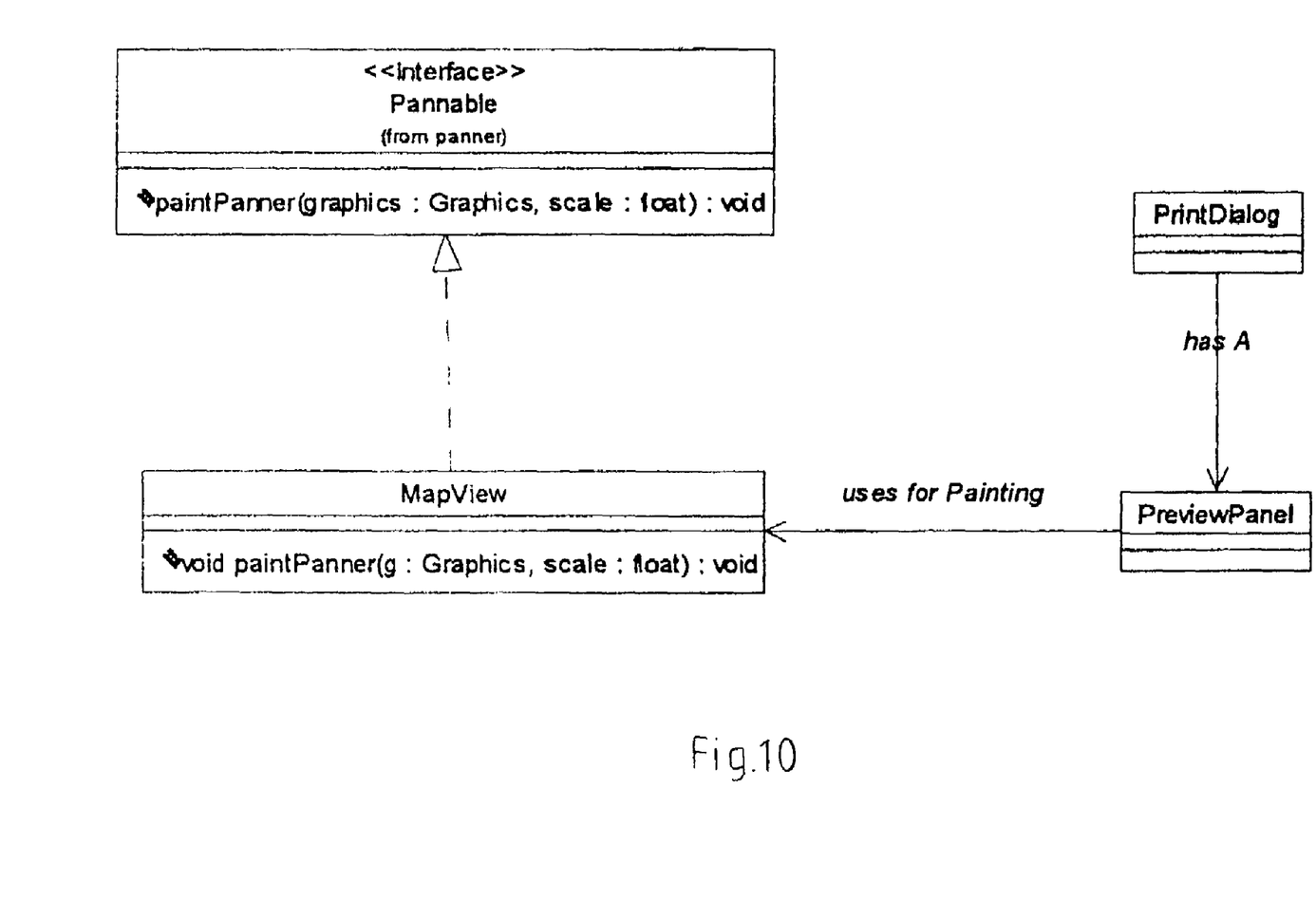
FIG. 10 is a class diagram of a part of a computer program for carrying out the methods of FIGS. 7 and 8.

The program that implements the disclosed print preview method is an applet written in Java (Java is a trademark of Sun Microsystems, Inc.). It can likewise be written in any other suitable programming language, preferably in an object-oriented programming language. FIG. 10 shows a diagram of the most relevant classes with the most relevant methods of the program. An outer dialog class of the print preview dialog is called PrintDialog. It contains the following items: i) The slider 8 which controls the scale of the content of the print preview window 3; ii) the print preview window 3 which shows the scaled preview. It is implemented by a class PreviewPanel. This class is an inner class of PrintDialog in order to have access to the member variables of the dialog. PreviewPanel represents the drawing area (i.e. the print preview window 3) in the print preview dialog.; iii) the print and cancel buttons 9, 10. They are instances of a class JButton (not shown).

The content of the print preview window 3 implements an interface Pannable. This interface provides the method that does the actual painting in the scale provided by the print preview window 3, the method paintPanner. This method is responsible for drawing a scaled version of the document page into a graphics using a particular scale (the graphics and the scale are passed as input parameters). A class MapView is responsible for drawing the whole graphical representation 5, for example, a network map in the print preview window 3.

Thus, a general purpose of the disclosed embodiments is to provide an improved method, computer system and computer program product for making large printouts with note-format printers.

All publications and existing systems mentioned in this specification are herein incorporated by reference.

Although certain methods, systems and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method performed by a computer system to print a document page that includes an image or a graphic and is split over several sheets with a user-selectable print scale, comprising:
   simultaneously displaying on a computer display, in one and the same dialog box, a preview of the document page as it may be printed, including displaying splitting said image or graphic over one or more sheets in a tile-like manner, and at least one control element for modifying the print scale of the image or graphic with which the document page may be printed;
   enabling a user to modify the print scale of the image or graphic by actuating the at least one control element, without a need for a user to open or access another dialog box, wherein modification of the print scale of the image or graphic may cause a number of sheets over which the printed document page extends to increase or decrease;
   dynamically changing the displayed print scale of the image or graphic relative to the displayed size of a sheet in response to the modification of the print scale of the image or graphic by actuation of the control element, and changing, in a jump-like manner, the displayed sheet splitting in response to the modification of the print scale; and
   printing the document page with the selected print scale and the displayed sheet splitting upon receiving a print command.

2. The method of claim 1, wherein the method is implemented by an application program.

3. The method of claim 1, wherein the method is implemented by a printer driver or an operating system.

4. The method of claim 3, wherein a program that initiates a print job uses a virtual sheet size which is larger than an actual sheet size, and, when the print job is passed to at least one of the printer driver and the operating system, the method is carried out using a representation of the document page adapted to the virtual sheet size as an input.

5. The method of claim 1, wherein the control element is a graphical slider.

6. The method of claim 1, wherein the sheet splitting is displayed by overlaying the preview of the document page with a grid.

7. The method of claim 1, wherein a sheet location identification is printed on the sheets of the document page.

8. The method of claim 1, wherein the sheet splitting is shifted relative to the page in response to a corresponding actuation of a sheet splitting shift control element or a pointing device.

9. A computer system, comprising:
   a processing unit and computer-readable storage arranged to process and store programs and program components;
   a computer display;
   a printer; and
   a program component, stored in the storage, that is arranged to cause a print preview of a document page that includes an image or a graphic and is to be printed over several sheets, and at least one control element for modifying a print scale of the image or graphic, to be simultaneously displayed in one and the same dialog box on the computer display, wherein splitting said image or graphic over one or more sheets in a tile-like manner is also displayed, wherein the program component is arranged to enable a user to modify a print scale of the image or graphic by actuating the control element, without a need for the user to open or access another dialog box, wherein the modification of the print scale of the image or graphic may cause a number of the sheets over which the printed document page extends to increase or decrease, wherein the program component is arranged to cause the displayed print scale of the image or graphic to dynamically change relative to the displayed size of a sheet in response to the actuation of the control element, and change, in a jump-like manner, the displayed sheet splitting in response to the modification of the print scale of the image or graphic, and wherein the program component is arranged to cause the document page to be printed with the selected print scale and the displayed sheet splitting upon receiving a print command.

10. The computer system of claim 9, wherein the program component is part of an application program.

11. The computer system of claim 9, wherein the program component is part of a printer driver or an operating system.

12. The computer system of claim 11, wherein a program that initiates a print job uses a virtual sheet size which is larger than an actual sheet size, and, when the print job is passed to at least one of the printer driver and the operating system, the printer driver or the operating system uses a representation of the document page adapted to the virtual sheet size as an input.

13. The computer system of claim 9, wherein the control element is a graphical slider.

14. The computer system of claim 9, wherein the sheet splitting is displayed by overlaying the preview of the document page with a grid.

15. The computer system of claim 9, wherein a sheet location identification is printed on the sheets of the document page.

16. The computer system of claim 9, wherein the sheet splitting is shifted relative to the page in response to a corresponding actuation of a sheet splitting shift control element or a pointing device.

* * * * *